26-5 S-
1/25/86 OR RE 32,292

United States Patent [19]

Gooden

[11] E Patent Number: Re. 32,292

[45] Reissued Date of Patent: Nov. 25, 1986

[54] METHOD OF TEXTURING CONCRETE WITH DEEP TEXTURE HAMMER

[76] Inventor: Howard P. Gooden, 10611 Endicott, Houston, Tex. 77035

[21] Appl. No.: 254,956

[22] Filed: Apr. 13, 1981

Related U.S. Patent Documents

Reissue of:

[64] Patent No.: 4,149,513
Issued: Apr. 17, 1979
Appl. No.: 712,104
Filed: Aug. 5, 1976

[51] Int. Cl.[4] ..... B28D 1/22
[52] U.S. Cl. ..... 125/6
[58] Field of Search ..... 125/1, 6, 7, 40–43

[56] References Cited

U.S. PATENT DOCUMENTS

| | | | |
|---|---|---|---|
| 328,197 | 10/1885 | Cullingworth | 125/6 |
| 376,296 | 1/1888 | Cummings | 125/7 |
| 702,037 | 6/1902 | Stigliz | 125/6 |
| 1,537,358 | 5/1925 | Lartique | 125/6 |
| 3,968,843 | 7/1976 | Shotwell | 173/39 |

FOREIGN PATENT DOCUMENTS

| | | | |
|---|---|---|---|
| 455393 | 2/1950 | Italy | 125/40 |

OTHER PUBLICATIONS

Concrete Construction, Nov. 1972, vol. 17, No. 11, article "Mechanical Finishing of Concrete", pp. 549–551.

Fugersull-Bard Catalog, Sheet 130t, "Chipping Hammer Accesories", 4 pages, dated prior to 8-5-75.

Affidavit, S. I. Morris, dated Aug. 18, 1981, V. E. McChargue, dated July 28, 1981, James M. Shilstone, dated Aug. 28, 1981.

*Primary Examiner*—Harold D. Whitehead
*Attorney, Agent, or Firm*—David Ostfeld; William E. Shull

[57] ABSTRACT

A pneumatically-powered hammer for giving concrete surfaces a rough texture and an efficient method for using the hammer. The hammer comprises a pneumatic riveting hammer with a uniquely short and blunt-ended accessory secured thereto. The pneumatic riveting hammer uses, for example, a 1½ inch piston and is activated by increased air pressure thus assuring a rapid, forceful stroke. Operation of the hammer includes holding the blunt end of the accessory securely against the concrete surface to be textured while moving the hammer horizontally across the surface in short vertical strokes during the entire time the hammer is activated. Excessive gouging and corner chipping caused by the hammer are repaired by partially filling such gouges or chips with wet, fast-setting concrete and securing leavings broken away by the hammering process to the wet concrete such that the repaired gouges and chips match the remainder of the surface in color and texture.

10 Claims, 5 Drawing Figures

METHOD OF TEXTURING CONCRETE WITH DEEP TEXTURE HAMMER

Matter enclosed in heavy brackets [ ] appears in the original patent but forms no part of this reissue specification; matter printed in italics indicates the additions made by reissue.

BACKGROUND OF THE INVENTION

1. The Field of the Invention

The present invention relates to an apparatus and method for giving concrete surfaces a rough, three-dimensional texture. The texture created by the apparatus and method of the invention substantially enhances the appearance of exposed concrete surfaces in buildings.

2. Description of the Prior Art

Concrete surfaces of buildings are often roughened by such processes as sandblasting and bush hammering in order to give the surfaces a warmer, softer, three-dimensional appearance. Bush hammering, or striking the surface of the concrete with the serrated face of a bush hammer or with the plurality of small-diameter blunt points of a scaler exposes the aggregate yielding a slightly rougher, generally more appealing texture than sandblasting which does not expose as much of the aggregate.

Even though the bush hammer or scaler generally is a pneumatically-powered, concrete-chipping hammer that can make a fairly large number of strokes in a short time, bush hammering is a relatively slow and expensive process. The teeth of the serrated face of the bush hammer and the small-diameter points of the scaler become dull quickly thus necessitating frequent changes in order to maintain a consistent texture in the concrete surface. The change, required at least once and sometimes twice a day, not only consumes valuable time, but, because the heads are very costly, also creates a substantial equipment expense. Furthermore, because bush hammers and scalers are small, light tools generally held by the operator in one hand, they are not sufficiently durable for the demands of the concrete chipping process. As a result, they break down frequently adding to equipment expense and causing further time loss. Also, because of their light construction, bush hammers and scalers must be held in one spot for a substantial number of strokes in order to properly texture the surface. Finally, the serrated head of the bush hammer and the small-diameter points of the scaler grab the surface of the concrete thus requiring the operator to lift the head of the chipping hammer from a textured spot before fixing on a new spot. This constant lifting and fixing consumes an inordinate amount of time. The resultant high cost of bush hammering, four to five times that of sandblasting, renders bush hammering noncompetitive with sandblasting. Thus many architects and builders who otherwise prefer the texture of bush hammering have turned to sandblasting.

Therefore, there is a clear need for a method of giving concrete surfaces a texture at least as rough as that created by bush hammering that has a cost competitive with the cost of sandblasting. The method must utilize a high-speed, powerful hammering device that can give a concrete surface a uniformly rough texture in minimal time while resulting in minimal equipment breakage.

SUMMARY OF THE INVENTION

The apparatus of the present invention is a deep texture hammer that creates a rich texture on concrete surfaces at a high rate of speed. The apparatus generally comprises a pneumatic riveting gun with a moil point secured to the end of the barrel and using an adapter known in the art. Usually, the moil point is modified to have a shorter length and to have a blunt end that has a relatively large diameter and, thus, dulls slowly. Furthermore, the moil point with the known adapter is used uniquely in combination with a 1½ inch piston. The gun is made especially fast and powerful by using air pressure greater than that normally used in conjunction with either the riveting gun or the concrete-chipping hammers of the prior art. Speed is further increased by moving the blunt end of the hammer across the concrete surface in short vertical strokes without lifting the blunt end from the surface similar to brushing with a paintbrush. Breakage of hammer parts, otherwise enhanced by the high speed and air pressure, is minimized by holding the blunt end of the moil point against the concrete surface during the entire time the hammer is activated. Breakage and jamming of the hammer is reduced further by means of an in-line compressed air cleaner and an in-line oiler for reducing contamination of the riveting gun and for continuous lubrication of moving parts, respectively.

One of the hazards of using the extremely high energy impact is the increased possibility of excessively gouging the concrete surface and chipping corners. While the brushing method and constant pressure technique of the invention serve to substantially reduce this hazard, they do not eliminate it altogether, and they cannot protect against exposure of faults within the concrete aggregate. In order to further assure a process that is competitive with sandblasting, a method for quickly patching such imperfections is necessary. Thus, the invention includes a method for patching imperfections wherein a layer of filler concrete of approximately the same color as the rest of the concrete is placed in the affected area and leavings, including dust and pieces of the concrete broken away from the concrete surface during the hammering process, are placed on the layer of filler concrete while it is still wet. This patching technique results in an essentially perfect match. This final step of the deep texture hammering process additionally increases the competitiveness of the invention with sandblasting because the technique is used to repair holes and chips formed and created during initial construction of the concrete surface.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
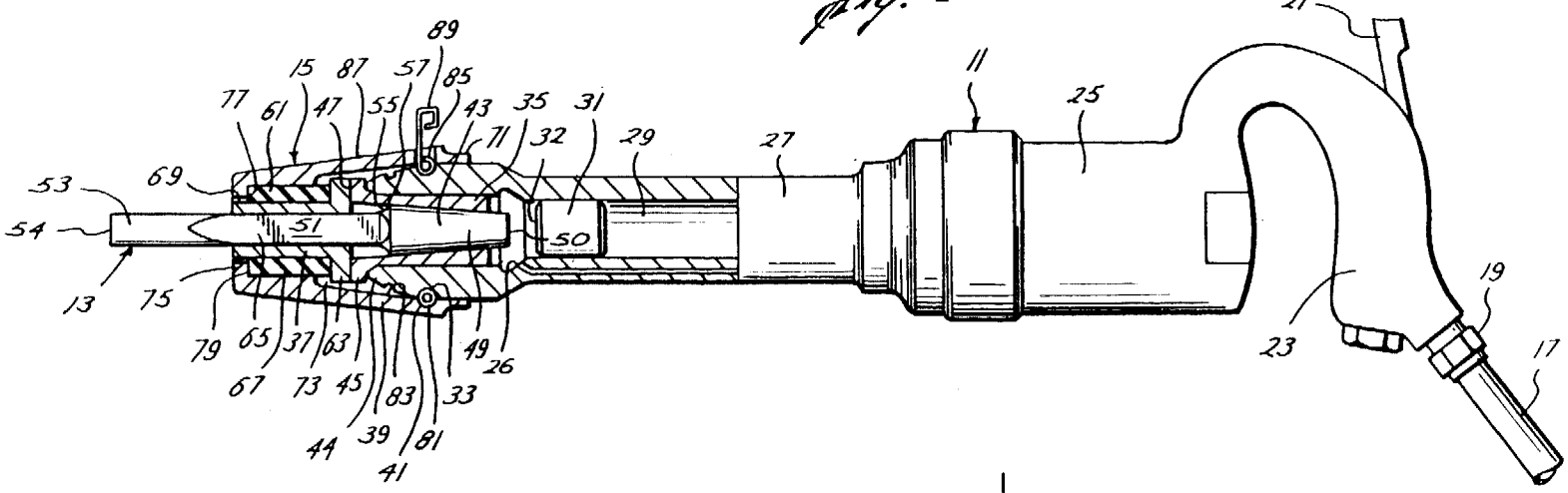
FIG. 1 is a side view of the preferred embodiment of the apparatus of the invention, partially in section and partially in elevation.

As shown in FIG. 1, the preferred embodiment of the apparatus of the invention is a pneumatically-powered jackhammer 11 adapted to hold a moil point 13 by way of securing means 15.

Jackhammer 11 comprises handle 23, tubular barrel 27 extending from handle 23, and valve body 25 disposed between handle 23 and barrel 27. Handle 23 includes activation trigger 21 and connection 19 by means of which air hose 17 is connected to jackhammer 11. Hose 17 and connection 19 should have sufficient strength to withstand elevated pneumatic pressure generally greater than 100 p.s.i.g. and preferably about 130 p.s.i.g. Barrel 27 has piston passageway 29 therethrough opening at barrel end 44 opposite handle 23 and valve body 25. Piston 31 having axial length less than 2½ inches, preferably about 1½ inch, and having blunt end 32 is disposed in passageway 29. Annular groove 33 is disposed about the outer periphery of barrel 27 near barrel end 44.

Valve body 25 contains the valve (not shown) which directs compressed air to two sets of nozzles. The first set of nozzles (not shown) nearest the trigger 21 is oriented to direct the piston 31 away from trigger 21 along passageway 29. The second set of nozzles 26 is oriented to direct the piston 31 toward trigger 21 along passageway 29.

Moil point 13 is an elongate piece of solid steel having tapered end 49 of circular cross section with blunt tip 50, middle section 51 of square cross section and cylindrical [blund] *blunt* end 53 having blunt tip 54. The diagonal of the square cross section of middle section 51 is equal to the diameter of the circular cross section of tapered end 49 at point 57 where tapered end 49 and middle section 51 join, thus forming four shoulders 55 facing toward middle section 51 at point 57. The diameter of blunt end 53 is approximately equal to the diameter of the square cross section of middle section 51.

Securing means 15 includes moil point adapter or upper sleeve 35, rubber bumper 67, lower sleeve 37, holder 39, and retainer ring 41. Adapter 35 is generally tubular in shape and has adapter passageway 43 therethrough. Adapter 35 is designed to slidingly fit into open end 44 of barrel 27. Adapter 35 is retained in one direction at end 44 by annular adapter flange 45 which forms the outer periphery of end 47 of adapter 35. Adapter passageway 43 is tapered with largest diameter at end 47 of adapter 35. Tapered end 49 of moil point 13 is generally slidingly disposed within adapter passageway 43, although tapered end 49 may become lightly locked within adapter passageway 43 as a result of the taper relationship described infra; the sliding relationship may be hindered as a result of a locking taper.

The taper angle of adapter passageway 43 is substantially identical to the taper angle of tapered end 49 of moil point 13, but the diameter of adapter passageway 43 at end 47 of adapter 35 is greater than the diameter of tapered end 49 at point 57. Furthermore, the smallest diameter of adapter passageway 43 is less than the diameter of tapered end 49 at point 57. Thus, tapered end 49 fits snugly within adapter passageway 47 when it is inserted into end 47 of adapter 35 a distance beyond point 57. Also, the axial length of tapered end 49 is greater than the axial length of adapter 35 whereby when tapered end 49 is inserted into adapter 35 such that point 57 of moil point 13 is aligned with end 47 of adapter 35, a portion of tapered end 49 extends from passageway 43 at the opposite end.

Lower sleeve 37 has a generally cylindrical body portion 61 with annular sleeve flange 63 at its interior end. Lower sleeve 37 includes a bore extending its entire length forming passageway 65 having square cross section similar in size to square cross section of middle section 51 of moil point 13. Lower sleeve 37 is disposed over middle section 51 of moil point 13 such that sleeve flange 63 rests against adapter flange 45. Annular rubber bumper 67 covers all but end periphery 69 of lower sleeve 37 and rests against sleeve flange 63. The outer diameter of bumper 67 is substantially the same as that of sleeve flange 63.

Holder 39 has the general shape of a frustum with cylindrical ring 71 at its base and holder passageway 73 therethrough. Holder 39 includes bores of sufficient diameter to fit over annular groove 33 at open end 44 of barrel 27 at its narrow end. Holder passageway 73 has substantially reduced diameter at the narrow end of holder 39 whereby annular holder flange 75 is formed. Internal shoulder 77 of holder flange 75 rests against end 79 of rubber bumper 67. End periphery 69 of lower sleeve 37 extends into the reduced diameter portion of holder passageway 73.

Internal annular groove 81 is disposed about inner cylindrical surface 83 of the bore of holder 39 and is aligned with annular groove 33 of barrel 27 in the assembled state of the apparatus. Notch 85 extends between internal annular groove 81 and outer surface 87 of holder 39, thus forming a radial passageway in the wall of holder 39.

Retainer ring 41, which is a spiral wire bent into a circular configuration, is disposed within the aligned annular grooves 33 and 81 with pull ring 89 extending through notch 85. Retainer ring 41 operates to retain securing means 15 with moil point 13 therein on the end of barrel 27.

Jackhammer 11 may be an Ingersoll-Rand Model 4A Riveting Hammer or other similar pneumatic device typically used in the prior art for riveting steel planks together. In the prior art, however, the 1½ inch piston and the blunt-ended moil point are not used and the riveter is not used for rough texturing concrete. In addition, high pressure greater than 100 p.s.i.g. and preferably about 130 p.s.i.g. is not used in conjunction with the Model 4A Riveting Hammer.

Figure 5:
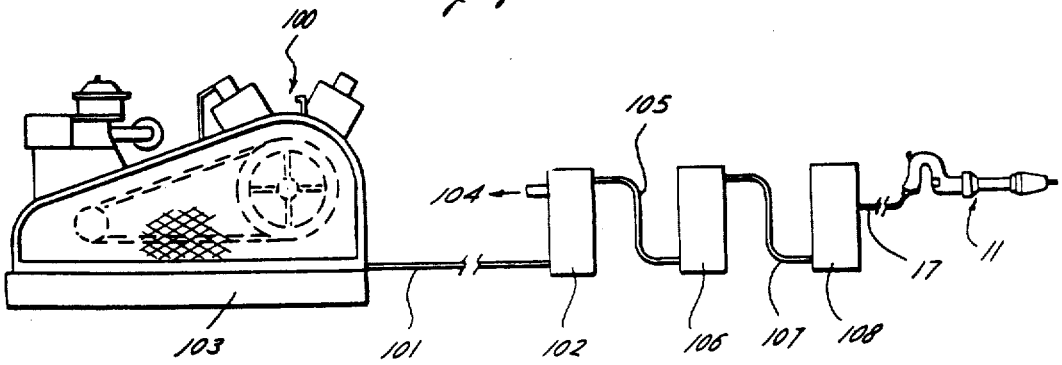
FIG. 5 is a schematic view of the preferred embodiment of the apparatus of the invention.

Air compressed by compressor 103 to greater than 100 p.s.i.g., preferably about 130 p.s.i.g. is supplied to the hammer from supply 100 (FIG. 5). It is fed from compressor 103 to centrifugal filter 102 by line 101 where moisture is removed, for example, by vortex effect and discharged through nozzle 104. The moisture free effluent of filter 102 is fed by line 105 to contaminant filter 106 which eliminates 95% to 99% of the impurities. The contaminant-free effluent of filter 102 is fed by line 107 to oiler 108 which injects oil into the air, such as by a venturi effect. The oil laden air effluent of oiler 108 is fed to line 17.

Figure 2:
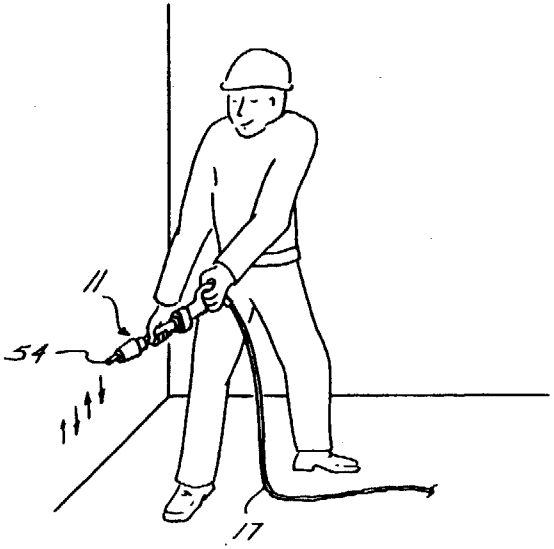
FIG. 2 is a pictorial illustration of the preferred method of operating the apparatus of the invention.

General operation of the hammer is initiated by forcing blunt tip 54 of moil point 13 against the concrete surface to be texturized. By pressing blunt tip 54 of moil point 13 against the concrete, tapered end 49 of moil point 13 is forced into adapter passageway 43 until tapered end 49 fits snugly into adapter passageway 43 and extends into passageway 29. The operator can stabilize himself as shown in FIG. 2 by putting handle 23 against his leg. When the operator has stabilized himself and the hammer is forced against the concrete surface, trigger 21 is depressed thus supplying compressed air from supply 100 through air hose 17 to the valve (not shown) in valve body 25. The valve directs the air from line 17 alternately to nozzles (not shown) and nozzles 26 whereby the air forces blunt end 32 of piston 31 to repeatedly strike blunt tip 50 of tapered end 49 of moil point 13. The initial strike of the piston causes moil point 13 to move slightly axially within adapter passageway 43.

The axial movement of moil point 13 is minimized by the force exerted by the operator thus preventing movement of shoulders 55 into lower sleeve 37. Preventing such movement is extremely important because (1) moil point 13 would otherwise become locked in lower sleeve 37 thus restricting the hammering impact of moil point 13, (2) the wedging action of shoulders 55 into lower sleeve passageway 65 would cause either or both moil point 13 and lower sleeve 37 to split, (3) the force of piston 31 against moil point 13 would be transferred by means of shoulders 55 to rubber bumper 67 and annular holder flange 75 thus hastening wear of rubber bumper 67 and forcing holder 39 loose from barrel 27. This latter result is the most serious because the high operating pressure would cause holder 39 and the parts secured by it to shoot from the hammer like a missile making the hammer extremely dangerous.

Furthermore, although the pressure exerted by the operator greatly reduces wear and compression of rubber bumper 67 as mentioned supra, such wear and compression is not prevented altogether due to the slight movement of moil point 13 within lower sleeve 37 and the general vibration of the hammer itself. As rubber bumper 67 wears down, its axial length becomes shorter thus permitting upper sleeve 35 and lower sleeve 37 to separate. If pressure is not exerted by the operator, blunt end 50 would move completely within adapter passageway 43 and blunt end 32 of piston 31 would strike upper sleeve 35. Because this would cause upper sleeve 35 to split, further breakage is prevented by continuously forcing moil point 13 against the concrete surface.

As piston 31 is moved away from moil point 13 by air through nozzles 26, the force exerted by the operator causes tapered end 49 to move axially back within adapter passageway 43. This back and forth action of moil point 13, generally in order of one-eighth to one-fourth inch, causes blunt tip 54 to hammer against the concrete surface, thus chipping away at the concrete.

In order to properly texture the surface as quickly as possible and to avoid digging into the concrete wall, the operator moves the vibrating blunt end 54 up and down across the concrete surface as indicated by the arrows in FIG. 2, or in some similar manner such as moving end 54 up and down the wall in short, substantially horizontal strokes. By moving the hammer in six-inch vertical paths a square-foot of concrete surface can be textured in thirty seconds. When the operator is through with an area or wishes to rest, he releases the trigger prior to releasing pressure against the surface. This precaution prevents breakage of the moil point securing means as discussed supra.

Although the pressure exerted by the operator not only reduces wear of rubber bumper 67 but also prevents piston 31 from striking upper sleeve 35 as would otherwise occur due to other wear of rubber bumper 67, rubber bumper 67 must still be replaced from time to time because the increased play between upper sleeve 35 and lower sleeve 37 might cause the sleeves to cant within holder 39 and to collide with one another resulting in breakage. Also, the canting will cause moil point 13 to become misaligned with respect to piston passageway 29 such that piston 31 no longer hits squarely against blunt tip 50 of tapered end 49. As a result, moil point 13 eventually shatters into small pieces and the upper sleeve 35 is also destroyed. Small bits of metal are then sucked into the valve (not shown) and also mar the piston 31 and sear the barrel of passageway 29. Hence the rubber bumpers 67 should be replaced frequently, such as, for example, after two hours of operation.

Figure 3:
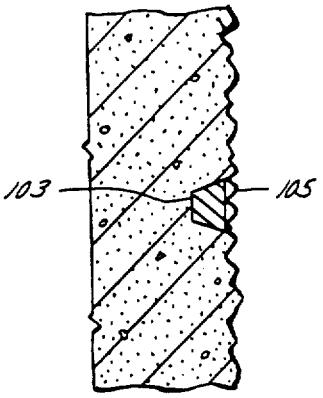
FIG. 3 is a sectional illustration of the wall repaired by the preferred method of the invention.
Figure 4:
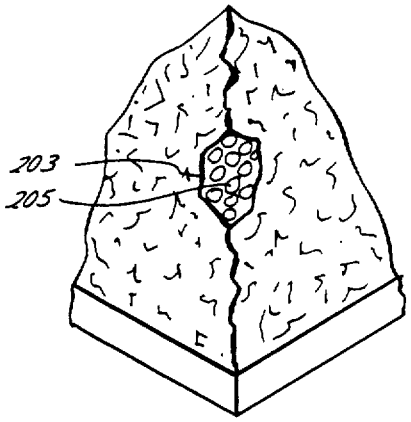
FIG. 4 is a pictorial illustration of the preferred method of repairing chipped corners.

Although the method of operation described results in an unexpectedly uniformly rough texture with mimimal excessive gouging, there normally will be a few spots where the concrete is excessively dug or where a lateral corner is chipped away, or where construction flaws are exposed. These spots can be repaired quickly, as shown in FIGS. 3 and 4, by mixing filler, such as quick-setting concrete to match color of concrete wall as closely as possible and filling void 303 or corner chip 203 with the filler until it is even (level) with the surrounding surface. Using powder residue resulting from the hammering process, the filler surface is then shaded to the identical color of the surrounding concrete. The repair process is completed by applying larger pieces of broken concrete 305, 205 resulting from the hammering process to the powder-covered filler in order to simulate the rough texture of the surrounding concrete.

This technique of repairing flaws may also be used to repair holes in the concrete surface resulting from forming errors such as concrete that has honeycombed due to improper vibration, from removal of inadvertently exposed reinforcing bars and weld-plates, and from removal of wall-ties used to space the walls of a concrete form.

Although the apparatus and method described in detail supra has been found to be most satisfactory and preferred, many variations in structure and method are possible. For example, any pneumatically-powered jackhammer may be used so long as it produces substantially the same high power strokes at substantially the same frequency as that produced by the embodiment described in detail. Moreover, the moil point may have additional shoulders for retaining it in the upper sleeve. Also, the holder may be held onto the barrel by a clamp rather than a retainer ring.

The above are merely exemplary of the possible changes or variations.

Because many varying and different embodiments may be made within the scope of the inventive concept herein taught and because many modifications may be made in the embodiment herein detailed in accordance with the descriptive requirements of the law, it should be understood that the details herein are to be interpreted as illustrative and not in limiting sense.

What is claimed as invention is:

1. A method for texturing a concrete surface comprising the steps of:

A. securing a blunt-tipped moil point rod to a pneumatically-powered riveter;

B. placing the blunt tip of the blunt-tipped rod against the concrete surface to be textured;

C. applying pressure to the riveter such that the blunt tip of the blunt-tipped rod is securely forced against the concrete surface;

D. activating the riveter; and

E. after activating the riveter moving the blunt tip rod in alternate strokes across the concrete surface while retaining pressure; and F. removing the blunt tip from contact with the surface before the blunt tip gouges the surface, whereby the concrete surface is substantially roughened.

2. The method of claim 1 further including the steps of:

G. deactivating the riveter; and

H. releasing pressure.

3. The method of claim 2 wherein the Step B includes moving the tip alternately up and down in short, substantially vertical strokes.

4. The method of claim 2 wherein Step B includes moving the tip alternately back and forth in short, substantially horizontal strokes.

5. The method of claim [7] *1* wherein said steps of placing and pressure applying take place prior to said step of activating.

*6. A method for texturing a concrete surface comprising the steps of:*

*A. securing a blunt-tipped rod to a pneumatically-powered jackhammer;*

*B. placing the blunt tip of the blunt-tipped rod against the concrete surface to be textured;*

*C. applying pressure to the jackhammer such that the blunt tip of the blunt-tipped rod is securely forced against the concrete surface;*

*D. activating the jackhammer; and*

*E. after activating the jackhammer moving the blunt-tipped rod in alternate strokes across the concrete surface while retaining said pressure; and*

*F. removing the blunt tip from contact with the surface before the blunt tip gouges the surface, whereby the concrete surface is substantially roughened.*

*7. The method of claim 6 further including the steps of:*

*G. deactivating the jackhammer; and*

*H. releasing said pressure.*

*8. The method of claim 7 wherein the Step E includes moving the tip alternately up and down in short, substantially vertical strokes.*

*9. The method of claim 7 wherein Step E includes moving the tip alternately back and forth in short, substantially horizontal strokes.*

*10. The method of claim 6 wherein said steps of placing and pressure applying take place prior to said step of activating.*

* * * * *